United States Patent [19]

Kawaguchi

[11] 4,047,208
[45] Sept. 6, 1977

[54] SUPPORTING DEVICE FOR SUPPORTING A ROLL FILM IN A CAMERA

[75] Inventor: Heizo Kawaguchi, Oyaguchi Kita, Japan

[73] Assignee: Asahi Kogaku Kogyo Kabushiki Kaisha, Tokyo, Japan

[21] Appl. No.: 639,687

[22] Filed: Dec. 11, 1975

[30] Foreign Application Priority Data

Dec. 11, 1974 Japan .................. 49-150633[U]

[51] Int. Cl.² ............................................. G03B 1/00
[52] U.S. Cl. .................................. 354/203; 354/213
[58] Field of Search ............... 354/203, 212, 213, 202

[56] References Cited

U.S. PATENT DOCUMENTS 2,253,090  8/1941  Peterson .................. 354/203 X
3,805,277  4/1974  Domnick .................. 354/203 X

FOREIGN PATENT DOCUMENTS 1,455,252  10/1966  France .................. 354/212
536,021  4/1930  Germany .................. 354/203

Primary Examiner—Edna M. O'Connor
Attorney, Agent, or Firm—Sughrue, Rothwell, Mion, Zinn and Macpeak

[57] ABSTRACT

A roll of film placed in a camera is restrained from completely free movement by a lever which frictionally engages the support shaft holding the film roll. When the leader is wound on the take up roll, the friction on the support shaft prevents bunching or misalignment of the film by keeping it taut. When the camera back is closed the lever is moved so as to be out of frictional engagement with the support shaft.

4 Claims, 1 Drawing Figure

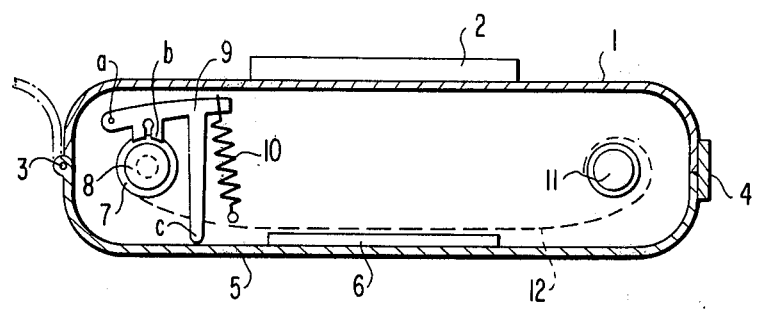

SUPPORTING DEVICE FOR SUPPORTING A ROLL FILM IN A CAMERA

BACKGROUND OF THE INVENTION

The present invention is in the field of camera film roll supporting mechanisms, and in particular is a mechanism for improving the reliability of the film loading operation.

Generally a roll of film is inserted into a camera by the following operation. The camera back is opened and the film roll is engaged with the support shaft on the film roll receiving side. The film leader is then mannually pulled and inserted in a slot on the take-up reel or spool. Thereafter the back is closed.

Typically the turning of the take-up spool pulls the film, which, in turn rotates the support shaft. The latter is usually free to rotate.

There are certain common disadvantages connected with the latter operation, all of which can be attributed to the freedom of rotation of the support shaft. The film can be loosely fed if disengaged from the take-up spool. Displacement of the film can occur at the film roll portion more than at the take-up spool causing deflection or inclination of the film. Also the film can bunch at the take-up spool causing the apparatus to effectively lock and prevent further winding thereof. These failures typically result when the operator removes his hands from the supporting shaft or take-up spool during loading. The film typically releases a small amount to result in the above disadvantages. Where the leader portion is a film of guide paper, its paper width tends to become thickly rolled due to its width being slightly wider than that of the take-up spool, the hardness of the paper, and the bend of the nose of film to be pushed into the spool. This thickly rolled portion often results in a stoppage of the winding of the film.

SUMMARY OF THE INVENTION

It is therefore an object of this invention to eliminate those limitations noted above.

According to the present invention, frictional resistance is applied to the film support shaft when the film is loaded and the back cover is open to thereby avoid looseness of the film on the film roll. This prevents accidental displacement of the film attached to the take-up spool and provides a tight winding of the film onto the take-up spool.

BRIEF DESCRIPTION OF THE DRAWINGS

The single FIGURE illustrates a preferred embodiment of the invention incased in a camera body. The view shown is looking from the top into the portion of the camera which houses the support shaft and take-up spool.

DETAILED DESCRIPTION OF THE PREFERRED EMBODIMENT

FIG. 1 shows a camera body 1 having, a lens mount 2, a hinged shaft 3 for a back cover 5, and a back cover hook 4. A roll of film, shown extended at 12, is placed in connection with a support shaft 8 that rotates freely due to bearing 7. The film is wound onto a take-up spool 11 and pressed flat by a press plate 6. The apparatus shown, except for a lever 9 and a spring 10, is conventional.

The roll film support shaft 8 is adapted to key-engage a film spool shaft when a film is loaded into the camera and is rotated simultaneously with the movement of film. The lever 9, which is positioned to frictionally engage the support shaft 8 at part b thereof is pivotally supported on body 1 at portion a, and is biased to engage said support shaft by spring 10. The lever 9 also includes a projection portion c which extends past the closed position of the back cover when the back cover is open. Thus, the lever 9 is disengaged from the supporting shaft 8 when the back cover 5 is closed, whereas in the condition where the back cover 5 is open, the contact surface b of the lever 9 is resiliently urged against the shaft 8 by the force of the spring 10 to serve as the frictional resistance with respect to the rotation of the film supporting shaft. Therefore, when the film is loaded, the core shaft of the film engages the supporting shaft 8 and is restricted by friction from rotating freely. Thus, when the nose of the film or leader paper is attached to the taking up spool and tightly wound, then said nose provides a tight underwinding portion with the aid of frictional resistance of the supporting shaft 8 to retain its condition even if the operator's hands are removed. When the back cover is closed, the back cover 5 pushes the portion c of the lever 9 to disengage the portion b from the supporting shaft 8 to set the same free thus releasing the core shaft of the film from the rotational resistance, and at this time, a press plate 6 holds the film so that the condition of film attached to the take-up spool may be maintained for accomplishment of normal winding.

From the foregoing, it will be appreciated that the present invention provides a simple construction which can avoid the above-mentioned accidental failure in winding without any trouble.

While a preferred embodiment of the invention has been illustrated, such description is for illustrative purposes only, and it is to be understood that various modifications in design, arrangement and construction may be made within the scope of the preceding claim. As described above, the device according to the present invention displays extremely useful effects in cameras.

What is claimed is:

1. In a camera of the type having, a support shaft for engaging and rotating with a film roll, a take-up spool for receiving the leader part of the film from said roll, and a back cover which can be opened to load and unload film rolls and is closed during picture-taking operation, the improvement comprising, means operative only when said back cover is open to frictionally restrict the unwinding of said film from said roll, said means engaged with said support shaft only when said back cover is open.

2. The apparatus of claim 1 wherein said means to restrict comprises a lever positioned in said camera body and fixed thereto to rotate about a pivot, a biasing means for biasing said lever in a first rotation direction about said pivot, said lever having a first portion thereof which frictionally engages said support shaft when the bias of said biasing means is not otherwise overcome, said lever having a second portion thereof positioned to be moved by the closing of said back cover to overcome the bias of said biasing means to disengage said first portion from said support shaft.

3. The apparatus of claim 2 wherein said biasing means is a spring attached to said lever.

4. The apparatus of claim 3 wherein said second portion is a projection which extends slightly past the closed position of said back cover when said cover is open and when said biasing means biases said lever to engage said first portion with said support shaft, whereby the closure of said back cover pushes said projection to overcome said bias to thereby disengage said first portion from said support shaft.

* * * * *